United States Patent [19]

Tamura

[11] Patent Number: 4,914,714
[45] Date of Patent: Apr. 3, 1990

[54] PORTABLE RADIO COMMUNICATION APPARATUS HAVING DIVERSITY RECEPTION FUNCTION

[75] Inventor: Yoshiharu Tamura, Tokyo, Japan

[73] Assignee: NEC Corporation, Japan

[21] Appl. No.: 90,673

[22] Filed: Aug. 28, 1987

[30] Foreign Application Priority Data

Aug. 30, 1986 [JP] Japan .................................. 61-202656

[51] Int. Cl.$^4$ .............................................. H04B 1/44
[52] U.S. Cl. ...................................... 455/78; 455/133;
455/140; 455/277
[58] Field of Search .......................... 455/272, 275-278,
455/280, 78, 133-135, 137, 139, 140; 343/883,
901, 915

[56] References Cited

U.S. PATENT DOCUMENTS 4,566,133 1/1986 Rambo ............................ 455/65 X
4,756,023 7/1988 Kojima ........................... 455/132 X

FOREIGN PATENT DOCUMENTS 3612235 10/1987 Fed. Rep. of Germany ...... 455/132
347936 1/1973 U.S.S.R. .............................. 455/132

*Primary Examiner*—Nelson Moskowitz
*Assistant Examiner*—John B. Sotomayor
*Attorney, Agent, or Firm*—Ostrolenk, Faber, Gerb & Soffen

[57] ABSTRACT

A portable radio communication apparatus includes a first antenna that can extend away from, or be retracted towards, an apparatus housing. The apparatus includes a second, usually flat antenna mounted within or around the outer periphery of the housing. When the first antenna is extended away from the housing, it is connected via a switch to a node, in turn, connected via respective filters to both a transmitter and a diversity receiver. At this time, the second antenna is connected to the diversity receiver via a respective filter. When the first antenna is sufficiently retracted towards the housing, a switch, mechanically coupled to the first antenna, disconnects the first antenna from the node, connects the second antenna to such node, and disconnects the second antenna from the diversity receiver.

25 Claims, 4 Drawing Sheets

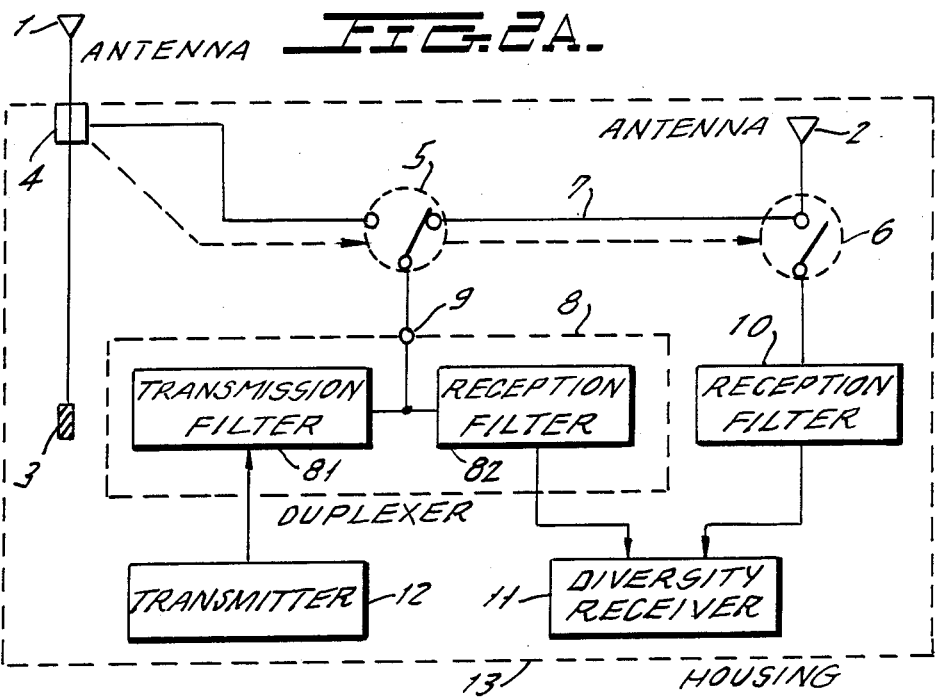
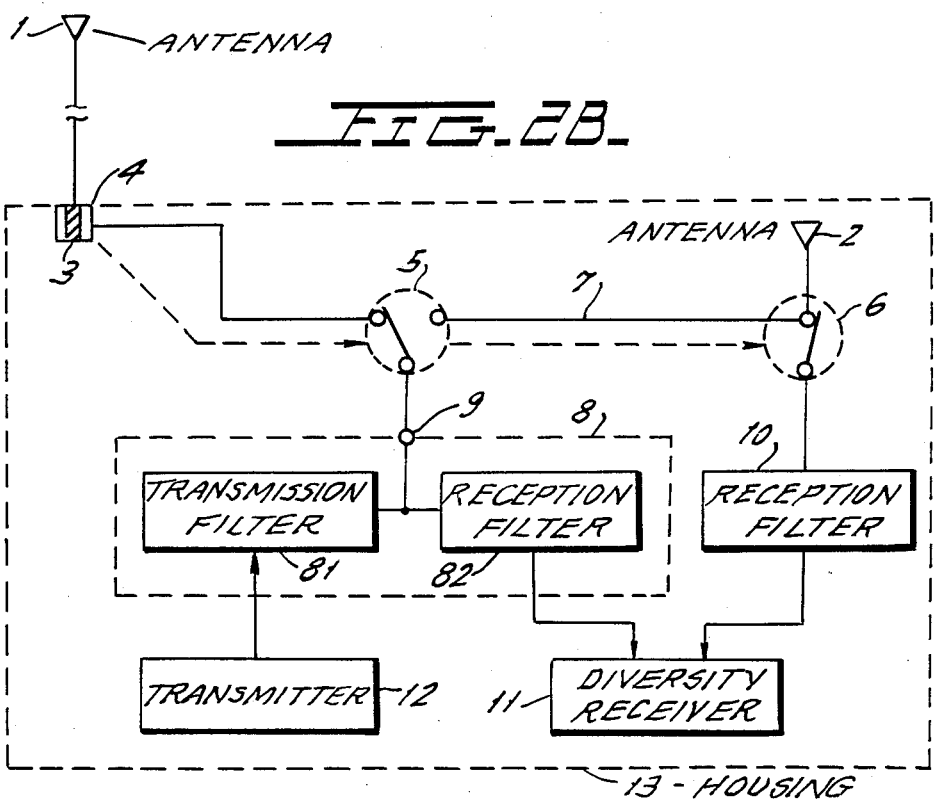

PORTABLE RADIO COMMUNICATION APPARATUS HAVING DIVERSITY RECEPTION FUNCTION

BACKGROUND OF THE INVENTION

The present invention relates to a portable radio communication apparatus and, more particularly, to such an apparatus having a diversity reception function.

An example of portable radio communication apparatus of the foregoing type is disclosed in "No. 2455: Study on a Diversity Antenna for Portable Radio Unit" by Taga et al, National Convention (Record) of the Institute of Electronics and Communication Engineers of Japan, pp. 10-155, 1984. The communication apparatus disclosed in this paper includes two folded, inverted F-type antennas which are built in a housing, so that diversity reception may be performed through those antennas. Although such construction is suitable for portable apparatus design, it fails to achieve a requisite degree of antenna gain.

A portable radio communication apparatus capable of attaining sufficient gain is disclosed in a Japanese unexamined laid-open patent application entitled "Portable Radio," No. Shô No. 62-49729, namely, 49729 of 1987 by Hashiomoto et al. which is assigned to the assignee of the instant application (Corresponding patent applications are: U.S. Ser. No. 897,989; European Ser. No. 86306575.1; Canadian, Ser. No. 516,870-8; and Australian, Ser. No. 61837/86.). As will be described in detail later, the apparatus of the foregoing Japanese application is provided with a single sleeve or whip antenna and a single built-in antenna for effecting diversity reception. The sleeve or whip antenna is connected to both a transmitter and a diversity receiver while the built-in antenna is connected to the diversity receiver. The sleeve or whip antenna may be tucked away in a housing to enhance portability. So long as the apparatus is used with the sleeve or whip antenna pulled out of the housing, sufficiently high reception and transmission gains are assured due to the high antenna gain and diversity gain of the sleeve or whip antenna. However, once the sleeve or whip antenna is retracted into the housing, the transmitter becomes substantially inoperable and makes bidirectional communication impractical.

SUMMARY OF THE INVENTION

It is, therefore, an object of the present invention to provide an improved portable radio communication apparatus having a diversity reception function.

It is another object of the present invention to provide a portable radio communication apparatus having a diversity reception function which achieves a sufficiently high reception gain.

It is yet another object of the present invention to provide a portable radio communication apparatus having a diversity reception function which is capable of transmitting even when a sleeve or whip antenna is retracted into a housing or folded adjacent the housing.

In accordance with the present invention, there is provided a portable radio communication apparatus comprising transmitter means, diversity receiver means, transmission filter means connected to the transmitter means, and first and second reception filter means connected to the diversity receiver means. The apparatus further comprises first antenna means capable of being retracted towards a housing of the apparatus, second antenna means mounted inside of or on an outer periphery of the housing, and switch means for connecting the second antenna means to a node between the transmission filter means and first reception filter means in a first condition in which the first antenna means is retracted towards the housing, and for connecting the first antenna means to such node and the second antenna means to the second reception filter means in a second condition in which the first antenna means is extended away from the housing.

BRIEF DESCRIPTION OF THE DRAWINGS

The above and other objects, features and advantages of the present invention will become more apparent from the following detailed description taken with the accompanying drawings in which:

FIGS. 2A and 2B are schematic block diagrams of a portable radio communication apparatus having a diversity reception function embodying the present invention, respectively showing two different conditions;

DESCRIPTION OF THE PREFERRED EMBODIMENTS

Figure 1:
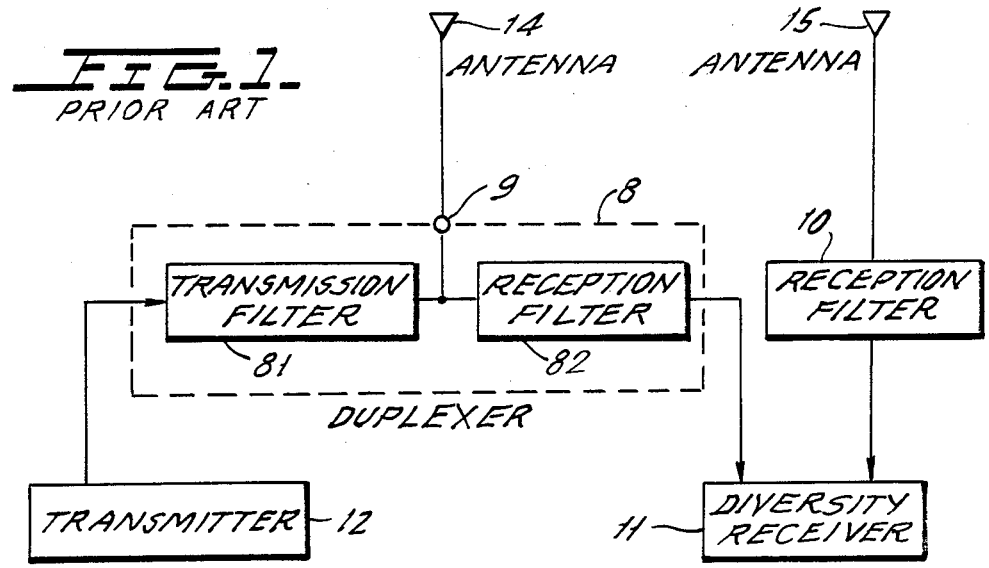
FIG. 1 is a schematic block diagram showing a prior art portable radio communication apparatus having a diversity reception function, for facilitating an understanding of the present invention.

To better understand the present invention, brief reference is first made to a prior art radio communication apparatus, shown in FIG. 1. As shown, the apparatus includes an antenna 14, which is connected to a transmitter 12 and a diversity receiver 11 through, respectively, a transmission filter 81 and a reception filter 82. Filters 81 and 82 are contained in a duplexer 8. An antenna 15 is connected to the diversity receiver 11 through a reception filter 10. The antenna 14 is implemented with a sleeve antenna or a λ/2 whip antenna which has a high radiation gain and allows a minimum of high-frequency current to flow through a housing. Here, λ is representative of the wavelength of a signal used. On the other hand, the antenna 14 15 is implemented with an antenna which, although lower in gain than a sleeve or whip antenna, can be built in a housing as is typical for a flat antenna.

So far as gain is concerned, both of the antennas 14 and 15 should preferably comprise a sleeve antenna or a λ/2 whip antenna. However, when it comes to portability and design, mounting two such antenna on a housing is difficult. For example, a λ/2 whip antenna has an element length of substantially 16 cm for a 900 MHz frequency band. Mounting two such antennas each having the foregoing length on a housing would be impractical. On the other hand, the antenna 15 exclusively for reception preserves the diversity effect even if the gain is lowered by about several dB compared to the transmit/receive antenna 14; therefore, antenna 15 can be implemented with a flat antenna. Further, not only the space diversity effect but also the polarization diversity effect can be expected if a flat antenna is used in combination with a vertical polarization antenna; such as a sleeve antenna or a λ/2 whip antenna.

For the above reason, using a built-in antenna in a portable radio communication apparatus in combination with the sleeve or whip antenna of FIG. 1 is advantageous, and actually this combination is used in the present invention. However, the construction shown in FIG. 1 has the drawback that when the sleeve or whip antenna is retracted, the apparatus becomes unable to transmit, as previously stated. Specifically, when the antenna 14 is retracted in the housing, the gain is lowered to a value which is even far smaller than that of the built-in antenna 15; in the worst case, the antenna 14 is electrically isolated and makes transmission impossible. Hence, the prior art apparatus shown in FIG. 1 cannot be used in a system in which a transmission should begin automatically in response to a reception.

Referring to FIG. 2A, a portable radio communication apparatus embodying the present invention is shown in block diagram form. In the figure, a first antenna 1 is implemented with a sleeve or whip antenna which may be retracted into a housing 13 of the apparatus or folded adjacent the housing as described in detail later. The antenna 1 protrudes from the housing 13 unless retracted or folded. In this particular embodiment, the antenna 1 is assumed to be bodily retracted into the housing 13. A second antenna 2 is implemented with a microstrip or like flat antenna which is built in the housing 13 or mounted on the outer periphery of the housing 13 so as not to protrude from the housing 13.

When the first antenna 1 is retracted into the housing 13 as shown in FIG. 2A, it is electrically disconnected from a first switch 5. By the movement of the first antenna 1 into the housing 13, the first switch 5 is automatically caused to shift the connection of an antenna terminal 9 of a duplexer 8 from the first antenna 1 to the second antenna 2. When terminal 9 is connected to antenna 2, a second switch 6, interlocked with the first switch 5, disconnects a reception filter 10, having the receive frequency band as its pass band, from the second antenna 2, the receive frequency band being the pass band of the filter 10. Specifically, the first antenna 1 is retracted into the housing 13, the switches 5 and 6 are actuated such that the second or built-in antenna 2 becomes connected to a transmitter 12 via a transmission filter 81 and also to a diversity receiver 11 via a reception filter 82.

In FIG. 2B, the apparatus of FIG. 2A is shown in a condition wherein the first antenna 1 is pulled out of the housing 13 to its outermost position. As shown, since contacts 3 and 4 are brought into connection, the first antenna 1 is connected to the switch 5. The switch 5 is operated to connect the first antenna 1 to the antenna terminal 9 of the duplexer 8 while disconnecting the second or built-in antenna 2. The second switch 6, on the other hand, is actuated to connect the built-in antenna 2 to the diversity receiver 11 via the reception filter 10. In short, when the first antenna 1 is held in the outermost position, the antenna 1 is shared for transmission and diversity reception while, at the same time, the second or built-in antenna 2 is exclusively assigned to diversity reception.

In the condition shown in FIG. 2B, a line 7 extending between the first and second switches 5 and 6 is connected to the antenna 2 and, therefore, apt to disturb high-frequency matching. Such an occurrence can be eliminated by dimensioning the line 7 sufficiently shorter than λ/4 or equal to an integral multiple of λ/2 of the receive frequency band.

Figure 3A:
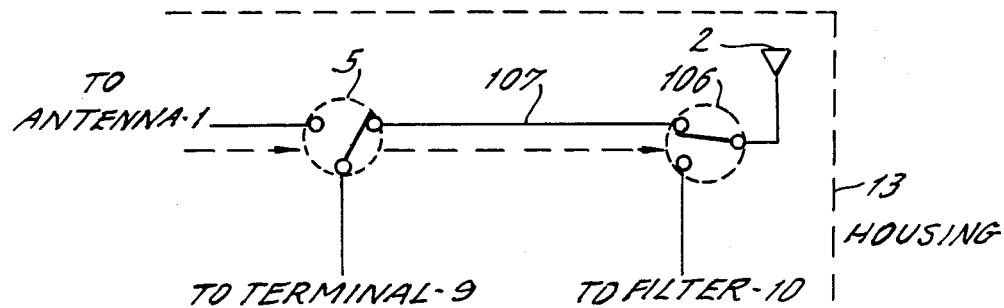
FIGS. 3A and 3B are schematic block diagrams of an essential part of a portable radio communication apparatus according to another embodiment of the present invention.
Figure 3B:
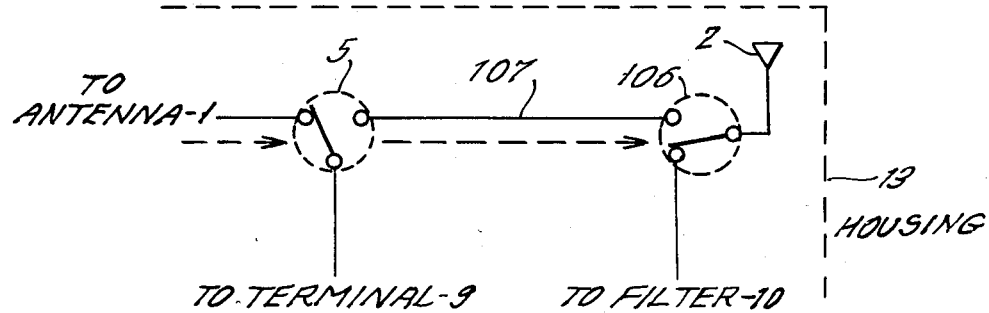

Referring to FIGS. 3A and 3B, an essential portion of a second exemplary embodiment of the present invention is shown. The second embodiment has the same structure as the first one of FIGS. 2A and 2B except that a switch 106 having three contacts is used in the second embodiment in place of the switch 6 having two contacts. The conditions shown in FIGS. 3A and 3B correspond to those of FIGS. 2A and 2B, respectively. In FIG. 3A, the first antenna 1 is disconnected from the terminal 9 of duplexer 8 while the second or built-in antenna 2 is connected via terminal 9 to the transmitter 12 and the diversity receiver 11 through the duplexer 8. On the other hand, in FIG. 3B, the first antenna 1 is connected via terminal 9 to the transmitter 12 and the diversity receiver 11 through the duplexer 8 while the second antenna 2 is connected to the diversity receiver 11 through the reception filter 10.

Unlike the connecting line 7 of FIG. 2B, a connecting line 107 is disconnected from the second antenna 2 in the condition shown in FIG. 3B. Accordingly, the line 107 has no adverse effect on the high-frequency matching, described above. In other words, the length of line 107 can be freely selected.

Figure 4:
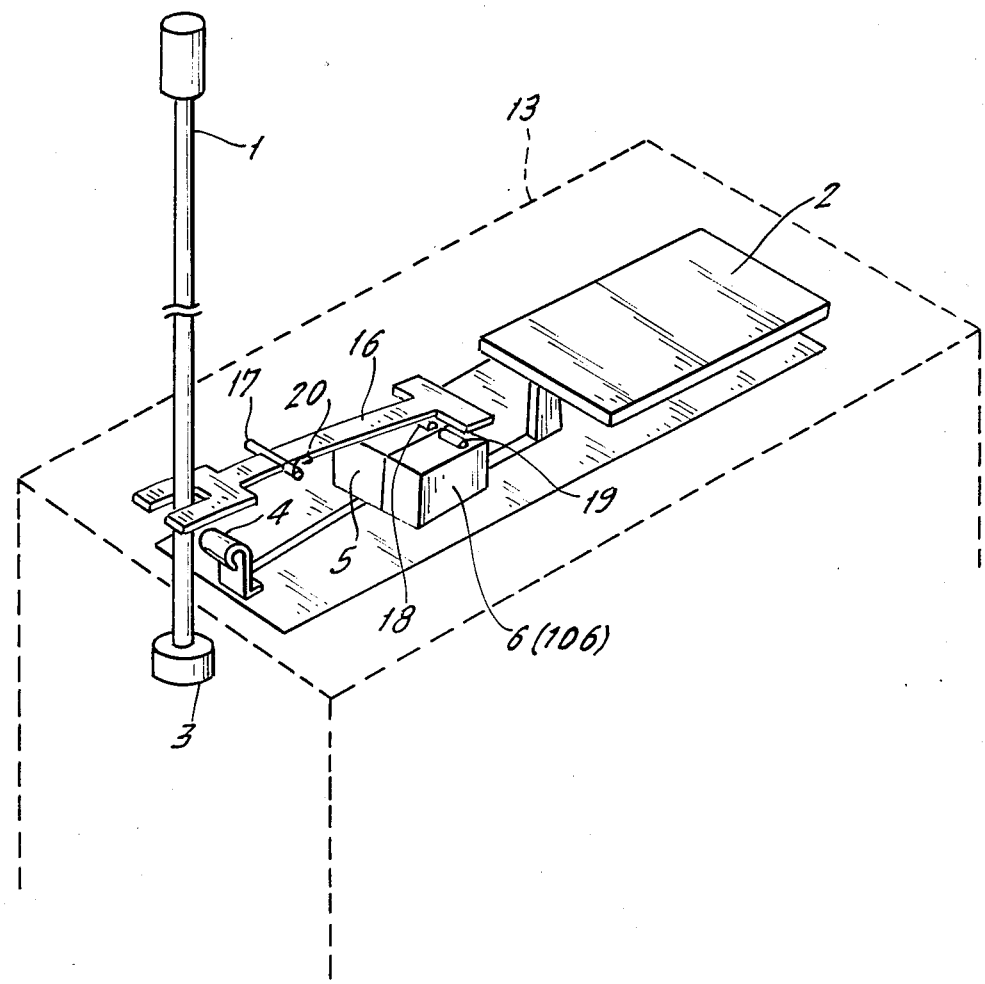
FIG. 4 is a schematic view of a specific construction of a switch driving mechanism which may be included in the apparatus shown in FIGS. 2A and 2B or 3A and 3B.

Referring to FIG. 4, there is shown an illustrative and not limitative mechanism for automatically actuating the switches 5 and 6 (or 106) in response to the movement of the first antenna 1 into and out of the housing 13. As shown, while the first antenna 1 is fully or partly received in the housing 13, a lever 16 is urged by a spring 20 to the position shown in the figure. As the antenna 1 is pulled out to the outermost position, the conductor 3 fixed to the bottom of the antenna 1 with the contact 4 and rotates the lever 16 about a pin 17 against the action of the spring 20. Then, the lever 16 presses against actuators 18 and 19 which are respectively associated with the switches 5 and 6 (or 106), whereby the switches 5 and 6 or 106 are actuated as explained above with reference to FIGS. 2A and 2B or 3A and 3B.

Figure 5:
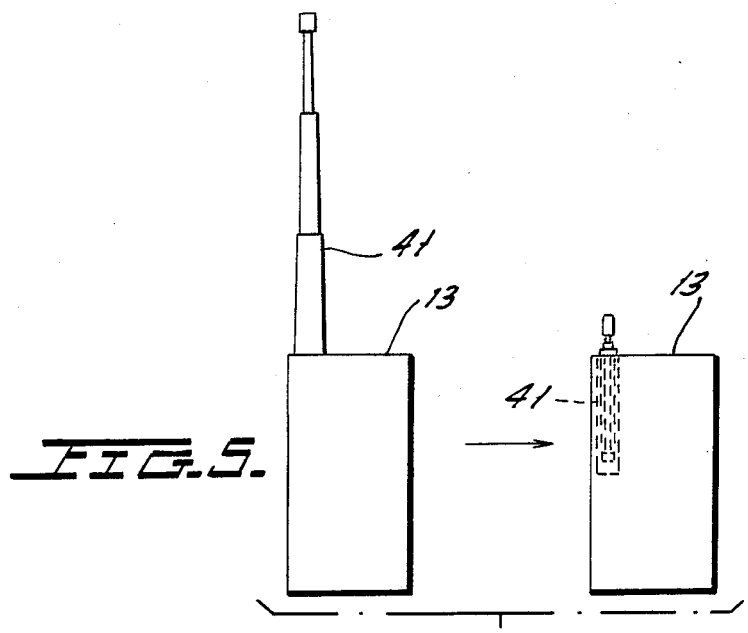
FIGS. 5 to 7 are schematic views showing exemplary structures for receiving and folding a sleeve and a whip antenna.
Figure 6:
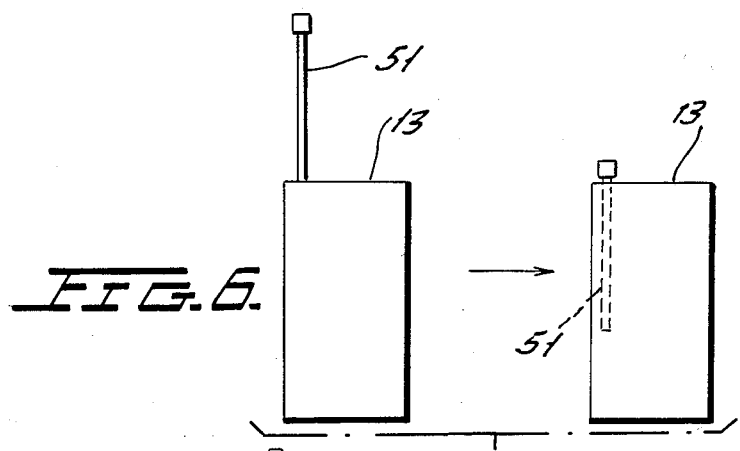
Figure 7:
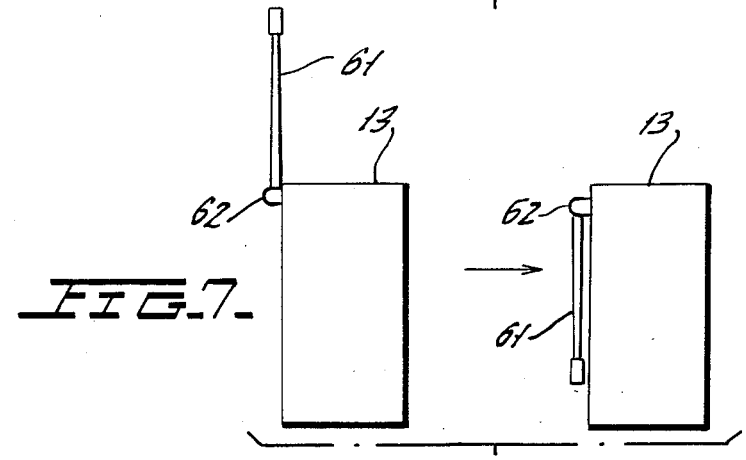

FIGS. 5 to 7 show exemplary configurations of the first antenna 1. In FIG. 5, a sleeve antenna 41 serves as the first antenna 1 and may be fully received in the housing 13. In FIG. 6, a whip antenna 51 serves as the first antenna 1 and may be fully retracted in the housing 13. In FIG. 7, a whip antenna 61 implements the first antenna 1 and is foldable along the outer periphery of the housing 13.

In summary, the foregoing describes a portable radio communication apparatus in which, when a sleeve or whip antenna is extended away from a housing of the apparatus, a sufficient gain is achieved due to the gain of that antenna and diversity reception by that antenna and by a built-in antenna. Another advantage of the present invention is that even when the sleeve or whip antenna is retracted towards the housing, the built-in antenna is automatically switched from a receive-only condition, to a transmit and receive condition thereby allowing transmission and reception to be performed as needed. Hence, user can conveniently wait for a reception while carrying the apparatus in a bag or the like with the antenna retracted, and confirm the reception, especially if needed to enable reception of a message. The user may find that the built-in antenna suffices for communication; if so, the sleeve or whip antenna may conveniently be left retracted.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A portable radio communication apparatus, comprising:
   a housing for the apparatus;
   transmitter means;
   diversity receiver means;
   transmission filter means connected to said transmitter means;
   first and second reception filter means connected to said diversity receiver means;
   first antenna means normally extending away from said housing but capable of being retracted towards said housing;
   second antenna means mounted inside of or on an outer periphery of said housing; and
   switch means for connecting said second antenna means to a node which, in turn, is connected to said transmission filter means and first reception filter means in a first condition in which said first antenna means is retracted towards said housing, and for connecting said first antenna means to said node and said second antenna means to said second reception filter means in a second condition in which said first antenna means is extended away from said housing.

2. An apparatus as claimed in claim 1, wherein said switch means comprises first and second switches which are mechanically coupled to said first antenna means so as to change switch states when said antenna is retracted towards or extended away from said housing;
   said first switch, in the first condition, disconnecting said first antenna means from said node while connecting said second antenna means to said node and, in the second condition, disconnecting said second antenna means from said node while connecting said first antenna means to said node;
   said second switch, in the first condition, disconnecting said second antenna means from said second reception filter means, and in the second condition, connecting said second antenna means to said second reception filter means.

3. An apparatus as claimed in claim 2, wherein a line extending between said first and second switches has a length which is shorter than $\lambda/4$, where $\lambda$ is a wavelength of a received signal.

4. An apparatus as claimed in claim 2, wherein a line extending between said first and second switches has a length which is an integral multiple of $\lambda/2$, where $\lambda$ is a wavelength of a received signal.

5. An apparatus as claimed in claim 1, wherein said first antenna means comprises a sleeve antenna.

6. An apparatus as claimed in claim 1, wherein said first antenna means comprises a whip antenna.

7. An apparatus as claimed in claim 1, wherein said second antenna means comprises a microstrip antenna.

8. A portable radio communication apparatus, comprising:
   first antenna means capable of selectively assuming a first condition wherein said first antenna means does not protrude from a housing of said apparatus, and a second condition wherein said first antenna means protrudes from said housing;
   second antenna means supported by said housing in such a manner as not to protrude from said housing;
   transmitter means;
   diversity receiver means; and
   switch means for, in the first condition, connecting said second antenna means to said transmitter means and diversity receiver means and, in the second condition, connecting said first antenna means to said transmitter means and diversity receiver means while connecting said second antenna means to said diversity receiver means.

9. An apparatus as claimed in claim 8, wherein said switch means comprises first and second switches which are actuated in response to a change of condition of said first antenna means;
   said first switch, in the first condition, disconnecting said first antenna means from said transmitter means and diversity receiver means while connecting said second antenna means thereto and, in the second condition, connecting said first antenna means to said transmitter means and diversity receiver means while disconnecting said second antenna means therefrom;
   said second switch, in the first condition, disconnecting said second antenna means from said diversity receiver means and, in the second condition, connecting said second antenna means to said diversity receiver means.

10. An apparatus as claimed in claim 9, further comprising:
    a transmission filter connected to said transmitter means;
    a first reception filter connected to said diversity receiver means;
    said transmission filter and first reception filter being connected to each other at a junction which is connected to said first switch; and
    a second reception filter connected between said second switch means and said diversity receiver means.

11. An apparatus as claimed in claim 10, wherein a line extending between said first and second switches has a length which is shorter than $\lambda/4$, where $\lambda$ is a wavelength of a received signal.

12. An apparatus as claimed in claim 10, wherein a line extending between said first and second switches is an integral multiple of $\lambda/2$ in length, where $\lambda$ is a wavelength of a received signal.

13. An apparatus as claimed in claim 8, wherein said first antenna means comprises a sleeve antenna which is received in said housing in the first condition and pulled out from said housing in the second condition.

14. An apparatus as claimed in claim 8, wherein said first antenna means comprises a whip antenna which is received in said housing in the first condition and pulled out of said housing in the second condition.

15. An apparatus as claimed in claim 8, wherein said first antenna means comprises a whip antenna which is folded along an outer periphery of said housing in the first condition and unfolded to stand on said housing in the second condition.

16. An apparatus as claimed in claim 8, wherein said second antenna means comprises a microstrip antenna contained in said housing.

17. A portable radio communication apparatus, comprising:

a first antenna capable of being retracted towards said housing of said apparatus;

a second antenna disposed in said housing or on an outer periphery of said housing;

a duplexer comprising a transmission filter, a first reception filter having a band pass which is a receive frequency band and an antenna terminal connected to both of the foregoing filters; and a second reception filter having a pass band which is a receive frequency band and an antenna terminal connected to the foregoing filter;

said antenna terminal of said duplexer and said antenna terminal of said second reception filter being connected, respectively, to said first and second antennas for effecting reception diversity when said first antenna is extended away from said housing;

a first switch for switching said antenna terminal of said duplexer from said first antenna to said second antenna when said first antenna is retracted towards said housing; and a second switch for disconnecting said second reception filter from said second antenna, said second switch being interlocked with said first switch.

18. A method of switching a first antenna of a portable radio communication apparatus of the type including a transmitter and a diversity receiver and being capable of assuming a first condition wherein said first antenna does not protrude from a housing of said apparatus and a second condition wherein said first antenna protrudes from said housing, and further including a second antenna supported by said housing in such a manner as not to protrude from said housing, said method comprising the steps of;

connecting said second antenna to said transmitter and diversity receiver in the first condition; and connecting said first antenna to said transmitter and diversity receiver while connecting said second antenna to said diversity receiver in the second condition.

19. A method as claimed in claim 18, wherein said connecting of said first and second antennas to said transmitter and diversity receiver under the respective first and second conditions comprises, in the first condition, connecting said first antenna to said transmitter and diversity receiver through respective transmission and first reception filters, and comprises, in the second condition, connecting said second antenna to said diversity receiver through a second reception filter.

20. A method as claimed in claim 18, wherein said connecting of said first and second antennas to said transmitter and diversity receiver are each responsive to a change of condition of said first antenna from one to the other of said first and second conditions.

21. A method as claimed in claim 18, wherein said first antenna is received in said housing in the first condition and pulled out of said housing in the second condition.

22. A method as claimed in claim 18, wherein said first antenna means comprises a whip antenna which is received in said housing in the first condition and pulled out of said housing in the second condition.

23. A method as claimed in claim 18, wherein said first antenna means comprises an antenna which is folded along an outer periphery of said housing in the first condition and unfolded to stand on said housing in the second condition.

24. A method as claimed in claim 18, wherein said second antenna means comprises a microstrip antenna contained in said housing.

25. A method as claimed in claim 23, wherein said first antenna comprises a whip antenna.

* * * * *